United States Patent [19]

Debroche et al.

[11] Patent Number: 4,804,436

[45] Date of Patent: Feb. 14, 1989

[54] MACHINE FOR THE MANUFACTURE OF A TIRE REINFORCEMENT

[75] Inventors: Claude Debroche, Cebazat; Daniel Laurent, Meylan, both of France

[73] Assignee: Compagine Generale des Etablissements Michelin, Clermont-Ferrand, France

[21] Appl. No.: 57,250

[22] Filed: Jun. 1, 1987

[30] Foreign Application Priority Data

Jun. 2, 1986 [FR] France ................................ 86 08011

[51] Int. Cl.$^4$ ...................... B29D 30/08; B29D 30/00
[52] U.S. Cl. .................................... 156/441; 156/117; 156/121; 156/397; 156/181
[58] Field of Search ............... 156/117, 121, 397, 166, 156/441, 181

[56] References Cited

U.S. PATENT DOCUMENTS

| | | |
|---|---|---|
| 1,317,664 | 9/1919 | Nall . |
| 3,113,738 | 12/1963 | Vanzo . |
| 3,573,135 | 3/1971 | Cooper et al. . |
| 3,616,001 | 10/1971 | Addis . |
| 3,748,203 | 7/1973 | Greene . |
| 3,881,237 | 5/1975 | Barnett . |
| 3,941,644 | 3/1976 | Klein et al. . |
| 4,061,524 | 12/1977 | Tolan . |
| 4,163,305 | 8/1979 | Semjonow ..................... 156/181 X |
| 4,409,059 | 10/1983 | Holroyd et al. . |
| 4,715,924 | 12/1987 | McConnell .................... 156/181 X |

FOREIGN PATENT DOCUMENTS

0204913 8/1956 Australia ............................ 156/397

Primary Examiner—Michael W. Ball
Assistant Examiner—Jeff H. Aftergut
Attorney, Agent, or Firm—Brumbaugh, Graves, Donohue & Raymond

[57] ABSTRACT

A process for producing a tire reinforcement is characterized by the fact that each reinforcement cord is projected individually into its place in the reinforcement. For this purpose, a machine is used which comprises laying members comprising essentially a rotary conduit which projects the cord by a radially outer extremity of the conduit and rollers which impose a linear speed of laying of the cord.

10 Claims, 6 Drawing Sheets

MACHINE FOR THE MANUFACTURE OF A TIRE REINFORCEMENT

BACKGROUND OF THE INVENTION

The present invention relates to the manufacture of tires. More particularly, it concerns a process and a machine for the manufacture of a reinforcement for tires.

Tires are generally reinforced by what are currently known as plies, comprising a plurality of adjacent, substantially parallel cords. In crown reinforcements, also known as belts, the cords are generally arranged diagonally with reference to a plane perpendicular to the axis of rotation of the tire. The expression "cord" is to be understood in its most general sense, namely both as a single cord and as a cable formed by the assembling of several individual cords or an equivalent assembly. In the prior art, the most usual method consists in preparing plies whose cords are directed parallel to their greatest length and are coated in rubber from a large number of bobbins of cords which are unwound simultaneously. These plies are then cut at the desired angle into pieces of suitable width, whereupon these pieces of plies are butt-joined by their ends which are parallel to the cords, with or without superimposing of cords, so as to form intermediate or semi-finished products used in the manufacture of the tire proper. The manufacture of such semi-finished products is illustrated, for instance, by U.S. Pat. No. 3,573,135.

This process requires expensive tool equipment and makes it necessary to manufacture a large number of plies which differ in the angles of the cords, the spacing of the cords and the widths of plies made necessary by the architecture of the tires to be produced. For radial carcass tires, the carcass plies are cut at an angle α of 90° with respect to the plane perpendicular to the axis of rotation of the tire. As to the plies intended to reinforce the crown of the tire, that is to say the part located below the tread, they are prepared in accordance with a considerable number of different angles α, generally, but not necessarily, between 15° and 50°.

The prior art also knows other techniques of preparing the crown reinforcement plies in which the reinforcement cords are laid, one after the other, by a reciprocating movement to form a ply of desired width and angle, as described in U.S. Pat. No. 4,409,059. This also implies a relatively complicated apparatus which permits high speeds only with very great difficulty due to the existence of reciprocating movements.

SUMMARY OF THE INVENTION

The object of the present invention is to provide a process which makes it possible to manufacture a tire reinforcement very simply from one bobbin of cord and by causing the cord to carry out only movements the mechanical realization of which is simple, and, in particular, which makes it possible to produce a reinforcement in situ, that is to say on the tire itself during the course of its manufacture, without having to pass through the production of one or more semi-finished products.

Another object of the invention is to provide a machine for the carrying out of such a process.

According to the invention, the process for producing a tire reinforcement, the reinforcement comprising adjacent, substantially parallel cords, is characterized by the fact that each reinforcement cord is projected individually into its place in the reinforcement, the reinforcement being produced on an element which defines the geometry of the reinforcement, the element and the cord having self-adhering properties.

DESCRIPTION OF THE DRAWINGS

The invention is illustrated in the accompanying drawings, in which.

DETAILED DESCRIPTION OF THE INVENTION

One particularly advantageous embodiment of the invention consists in manufacturing a reinforcement, particularly a metal wire crown reinforcement, directly on the blank of the future tire during its manufacture. This is what is described below. The metal wire used is a steel cable comprising 6 strands, each 23 hundreths of a millimeter in diameter. However, this embodiment is not limitative and the crown reinforcement may also be produced on a separate support ring, as is current practice in the present making of tires. The reinforcement ring obtained can then be transferred onto the tire. Likewise, one can also manufacture a crown or other reinforcing ply in the form of a semi-finished product or else a complex comprising several plies. Among all these embodiments, only the element on which the reinforcement is produced changes. This element is not part of the invention. Similarly, the nature of the material of the reinforcement cord may vary.

The process of the invention is characterized by the fact that each reinforcement cord is projected individually into its place in the reinforcement by means all the moving parts of which are in rotation. These rotary means assure simultaneously orienting of the cord in a plane of rotation of the rotary means, unwinding of a desired length of the cord which is cut to the desired length by cutting means, and projecting of the cord into its place in the reinforcement.

Figure 1:
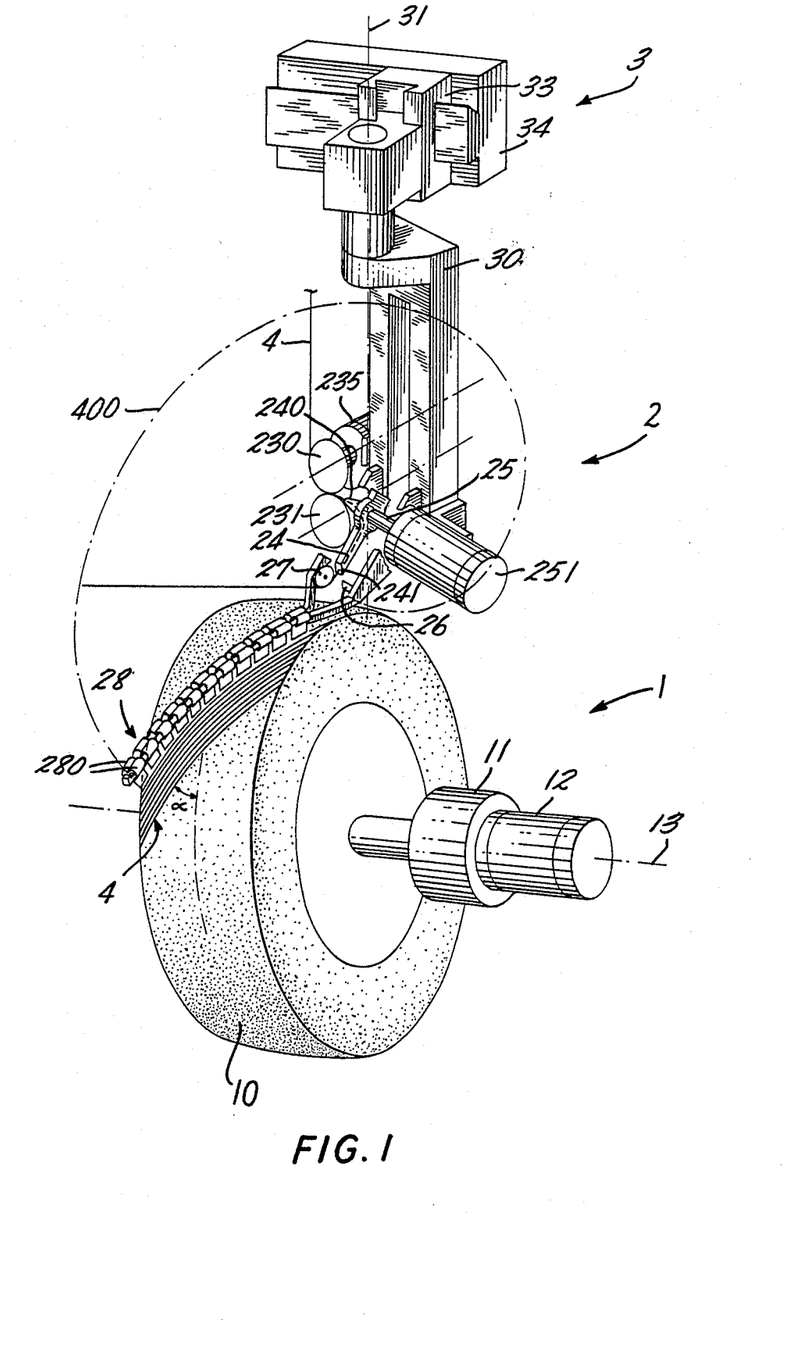
FIG. 1 is a perspective view of the essential members of a machine according to the invention.

FIG. 1 shows a machine having laying members 2, which are positioned suitably with respect to the tire 1 due to the degrees of freedom which are imparted to them by the presentation members 3. The presentation members 3 make it possible to adjust the position and orientation of the laying members 2 with respect to the element on which a reinforcement is produced. Depending on the architecture of the tire 1, the latter already has a carcass reinforcement and/or some other suitable reinforcement. The reinforcement cord 4 is projected like the lash of a whip onto the tire 1, this constituting the principle of the manufacture of the reinforcement. In order that the manufacture of the reinforcement can be successfully carried out, it is important that the system formed by the element onto which the cord 4 is projected and the cord 4 itself enjoy self-adhering properties. Stated differently, the cord 4 must have a tendency to stick to the element when it is projected onto it. This can be obtained by any suitable means. For example, the surface 10, which in the present case is the crown region of the tire 1 being manufactured, is previously coated with rubber having suitable properties of adherence for the cord 4. If necessary, the cord 4 is subjected to a suitable treatment; for example, it is coated with rubber by a device for the preparation of the cord 4 such as the one described further below.

The presentation members 3 must be designed in such a way that the cord 4 is deposited at the place in the reinforcement and in the manner desired. The region where the belt of a tire is going to rest defines a surface approximately in the shape of a partial torus while the projecting of the cord necessarily takes place in a plane apart from the existence of any transverse field of forces of, for instance, magnetic or pneumatic origin. Therefore, the cord 4 will deposit along the intersection of this surface by a plane. The method of production of a reinforcement applied to the manufacture of a tire belt "in situ" offers, for the trajectory of the cord 4 in the reinforcement, full latitude for producing the intersection of the surface by a plane. Furthermore, one can possibly move somewhat away from the intersection as just defined by guiding the cord 4 just before the depositing of it.

The first embodiment, shown in FIG. 1, makes it possible to produce crown reinforcements of the tire 1 which are not necessarily symmetrical. For this purpose, the support arm 30 can turn around an axis 31 to adjust the laying angle α of the reinforcement cords 4 of the crown of the tire 1 and the approach to the tire 1 by the laying members 2 is assured by the vertical sliding of the axis 31 with respect to an intermediate part 33, which slides horizontally with respect to a hooking part 34. Thus, the axis 31 can assume axially all desirable positions with respect to the tire 1 so as to vary the trajectory of the cord 4 in the reinforcement.

Figure 2:
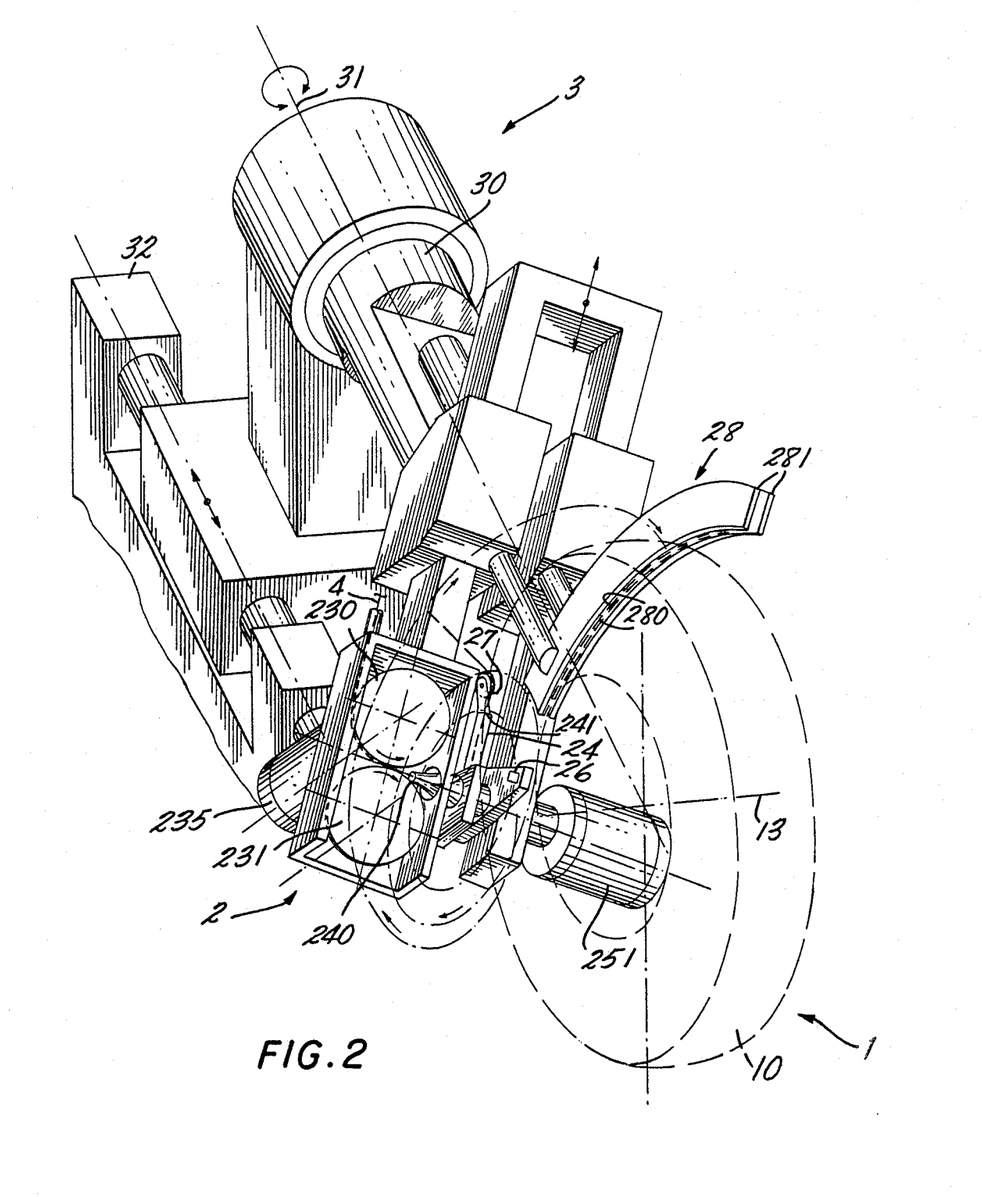
FIG. 2 is a perspective view of the essential members of another arrangement of a machine according to the invention.

In a second embodiment, shown in FIG. 2, the laying angle α of the reinforcement cords 4 of the crown of the tire 1 is adjusted by a rotation of the support arm 30 around an axis 31 which intersects the axis of rotation 13 of the tire 1 axially in the center of the latter. This makes it possible to produce reinforcements which are symmetrical with respect to the median plane of the tire 1. The approach to the tire 1 is assured by a sliding along a hooking part 32. In order to improve the legibility of the drawings, the mechanisms controlling these movements have not been shown in detail; they are indicated schematically by arrows.

Figure 4:
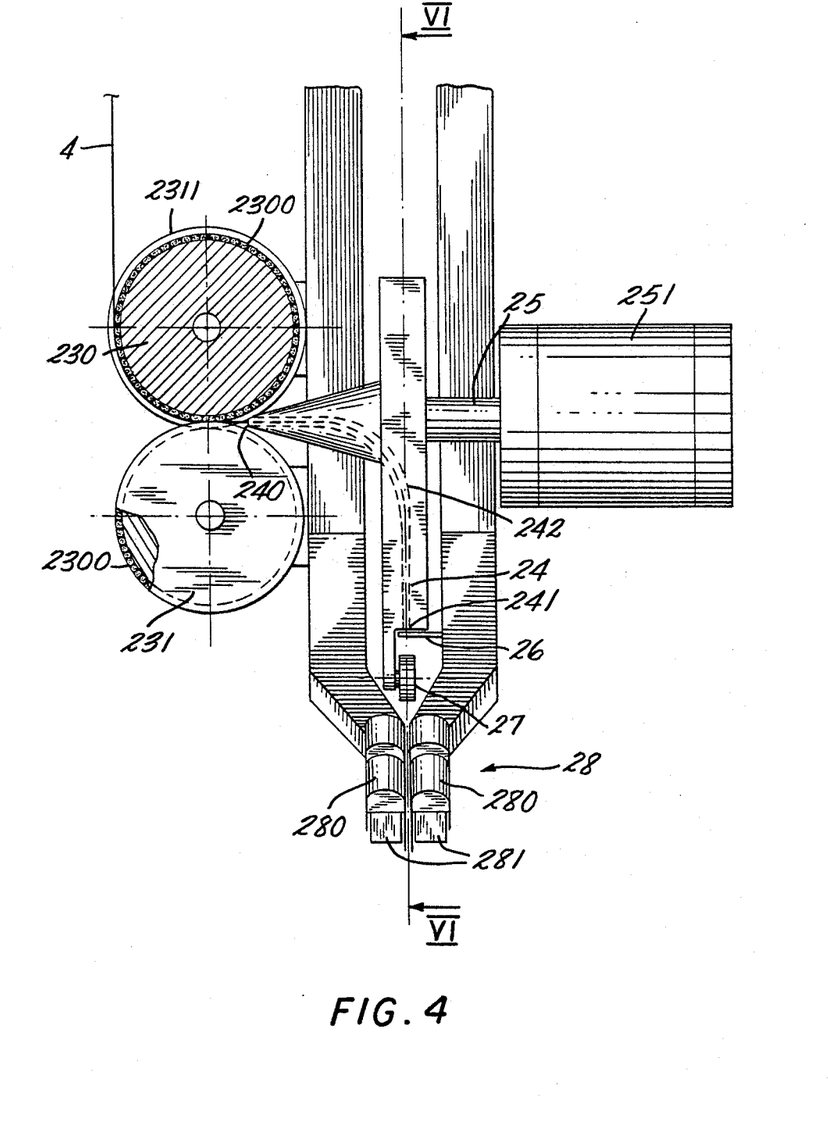
FIG. 4 is a view in elevation showing the members for the laying of the reinforcement cord.

The laying members 2 will now be described in greater detail with reference more particularly to FIGS. 4 to 6. The laying members 2 comprise essentially:

means imposing a linear speed of laying of the reinforcement cord 4, a rotary conduit 24 fastened on a shaft 25 constituting an axis of rotation of the conduit 24, in such a manner that a radially outer extremity 241 of the conduit 24 (referred to more simply as the "extremity" in the following) is directed substantially in a plane perpendicular to the axis of rotation of the conduit 24, the conduit 24 receiving the reinforcement cord 4 by a base 240 of the conduit 24 which is located approximately on the axis of rotation and projecting the cord 4 by the extremity 241, means for cutting the cord 4.

The extremity 241 is preferably directed radially, as in the example described, or else is inclined in the direction opposite the direction of its rotation. The cutting means are preferably disposed behind the conduit 24 (in the direction of passage of the cord 4) and, in this case, a support is provided for the cord 4, which support is integral with the conduit 24, fastened radially in an extension of the radially outer extremity 241 to the conduit 24, thus providing a support for the cord 4 just to the rear with respect to the direction of rotation of the conduit 24; the cutting means are then arranged radially between the extremity 241 and the support.

The means imposing the linear speed of laying of the cord 4 consist of rollers 230 and 231 having a peripheral covering 2300 of rubber so as to permit the driving, without sliding, of the cord 4. In very advantageous fashion, the cord 4 is wound a quarter of a revolution around the roller 230 which for this reason has two flanges 2311. This assures a better driving of the cord 4. The rollers 230 and 231 are driven by a motor 235, and a notched belt (not shown) provides assurance that their rotations are at all times synchronous.

Following the path traversed by the cord 4, the latter penetrates then into the conduit 24 via its base 240 located on the axis of rotation of the conduit 24 and is projected out of the extremity 241 by the rollers 230 and 231 assisted by the effect of the centrifugal force applied to the cord 4 by the rotation of the conduit 24 imparted by the motor 251.

Upon each turn of the conduit 24, the cord 4 is cut by cutting means, formed here very simply of a stationary knife 26 which is fastened radially at a level just above the extremity 241 of the conduit 24 and angularly in the vicinity of the laying zone. The precise angular position of the knife 26 as well as the approach of the assembly of the laying members 2 with respect to the tire 1 constitute positioning adjustment parameters of the cords 4 on the tire 1.

The conduit 24 has a reservoir 242 which makes it possible momentarily to accumulate the cord 4 which is delivered by the rollers 230 and 231 when the cord 4 is blocked at the outlet of the conduit 24 by the knife 26.

The precise form of the part comprising the conduit 24 is, of course, determined by the desire to impart very good static and dynamic equilibrium to the parts in rotation.

Figures 5, 6:
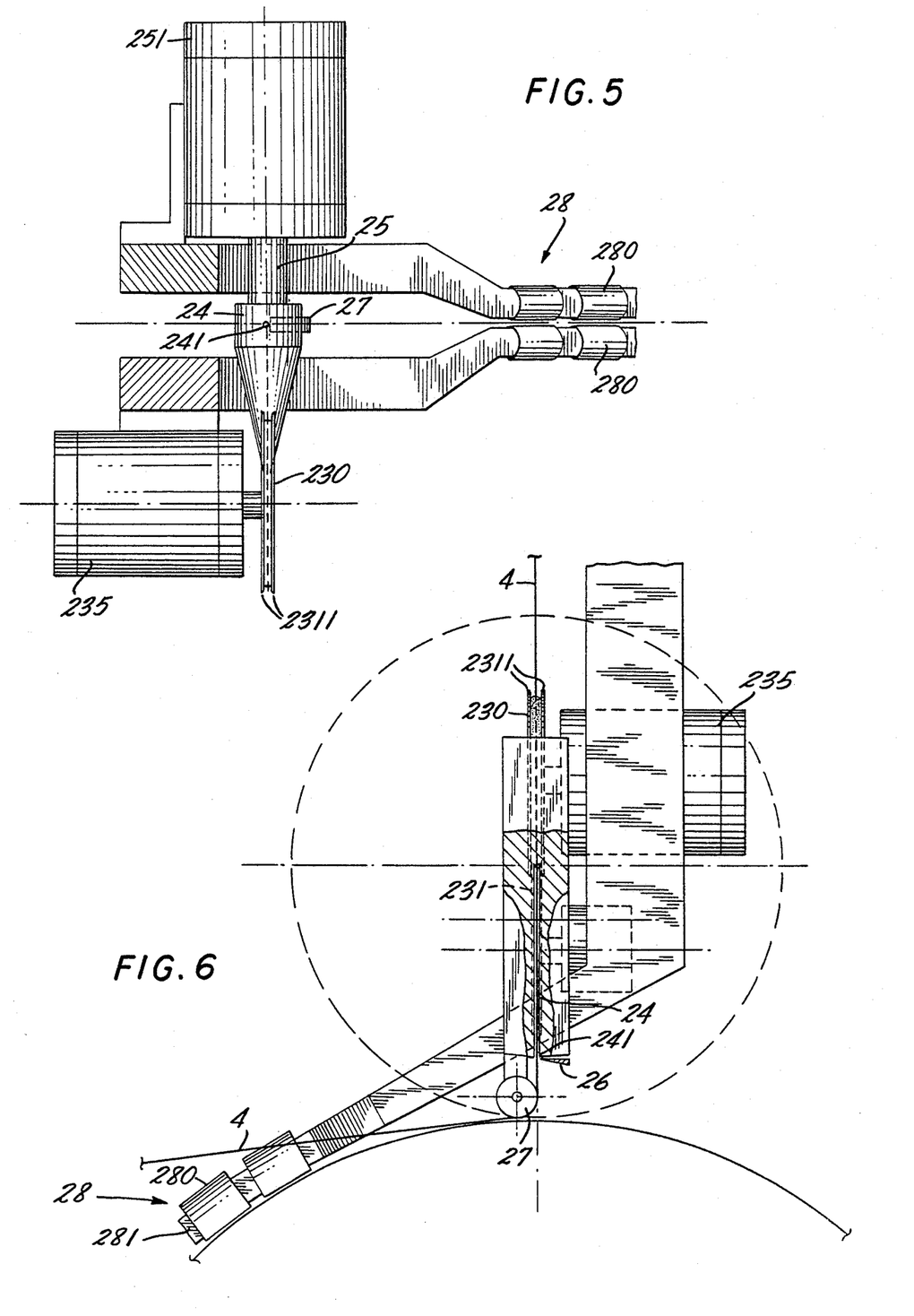
FIG. 5 is a plan view of the laying members.
FIG. 6 is a section along the line VI—VI of FIG. 4.

The support for the cord 4 is formed here by a roller 27 which is readily visible in FIG. 6. In this way, the rubbing of the cord 4 on the laying members 2 is reduced to a minimum since, due to the existence of the support, there is practically no rubbing in the radially outer extremity 241 of the conduit 24 and the roller 27 generates only a negligible resistance to rolling. Preferably, the roller 27 accompanies the cord 4 up to the surface on which it is placed. This roller 27 therefore assists in arranging the cord 4 in its place in the reinforcement by an application effect.

The tire 1 is mounted on a support 11 which is driven in rotation (continuous or in sequences) by the motor 12. All the movements of the laying members 2 must be coordinated with each other. Thus, while the conduit 24 makes a turn, the tire must turn through a small angle corresponding to the pitch of the reinforcement of the tire and therefore to the distance between two cords 4, measured circumferentially. In the same way, while the conduit 24 makes a turn, the cord 4 must emerge radially from the extremity 241 by a length corresponding to the length of the cord which it is desired to place on the crown 10 of the tire 1. The rollers 230 and 231 therefore impose a speed of unwinding which must be such that the advance of the cord 4 during one turn of the conduit 24 is equal to the length of the cord 4 to be placed on the tire 1.

It is also possible to produce reinforcements which have cords of different lengths arranged alternately one after the other. For this purpose, the reinforcement is made in two successive stages; first of all, the cords of a given length are laid with a pitch twice the final pitch, whereupon a cord of another length having the same double pitch is placed in the spaces between them. It will be easily understood that, in general, by successive passes one can thus produce all the desired variant embodiments for the reinforcement of the tire, comprising cords of identical or different length, centered axially or not.

For starting, the rotation of the conduit 24 is, for instance, first of all brought about, whereupon, the tire 1 being in rotation, the drive motor 235 for the rollers 230 and 231 is started. This starting must be sufficiently rapid that the first cord 4 laid by the first complete turn of the conduit 24 has the desired length. As a variant, the tire 1 being in rotation, the rollers 230 and 231 are started, as well as the rotation of the conduit 24 while maintaining the ratio of the speeds of rotation of the rollers 230 and 231 and of the conduit 24 constant. In this case, the correctness of the length of the cord 4 laid is automatically respected; the starting must be sufficiently fast that the system reaches its nominal speed just slightly before the conduit 24 has made a complete turn, so that the dynamic conditions of laying are identical for all the cords 4 of the reinforcement produced, which guarantees the uniformity of the laying by projection. It is therefore necessary that the inertia of the rollers 230, 231, the conduit 24, and the system of feeding the cord 4 is sufficiently low. All the parts movable in rotation must have a sufficiently low moment of inertia of rotation with respect to the drive torque available. If necessary, a system for the feeding of the cord 4 which does not impose any inertia other than that of the cord 4 which is placed in movement itself will be selected.

The process for producing a reinforcement for a tire 1 consists therefore in laying each reinforcement cord 4 individually in its place by rotary means, formed here essentially by the conduit 24 and the rollers 230 and 231 imposing the linear speed of the cord 4 introduced in the conduit 24. The extremity of the cord 4 describes a trajectory represented by the axis line 400. These rotary means organize the unwinding of a desired length of the cord 4 from out of the laying members. When a length of cord 4 is close to the laying surface, the cord 4 is cut by the knife 26, the trajectory of the length of cord 4 thus freed continuing necessarily in the plane of rotation of the conduit 24.

In order to assure the good operation of this process for the production of a reinforcement, it is desirable that the projection of the cord 4 be effected onto a hard surface, imparting a good geometry to the reinforcement. When a crown reinforcement is made on a tire blank during the course of manufacture, the inner cavity of the tire must therefore be previously filled by a membrane which assures this suitable geometry, inflated to a sufficiently high pressure. Or else, a removable rigid core defining the shape of the inner surface of the tire must support the tire. In order to obtain suitable self-adhering properties between a metal cord 4 and the surface onto which it is projected, the cord 4 is covered with rubber which has undergone initial vulcanization and the surface is also covered with a layer of rubber (not vulcanized).

The machine advantageously comprises, furthermore, a device 28 for receiving the reinforcement cord 4, receiving the cord 4 in the plane of rotation of the conduit 24. This device 28, so to speak, repesents physically the path of the cord 4 just before it touches the surface on which it is placed and assures great precision of the laying of the cord 4. The device 28 is formed essentially of plates 280 fastened to holding means 281, the plates 280 being arranged in pairs on opposite sides of the trajectory of the cord 4 so as to assure a guidance, and if necessary a braking, of the cord 4, at least at its extremity, depending on the distance between plates 280 and their flexibility. A device 28 of this kind can be shaped so that it can move the cord 4 slightly away from its natural trajectory.

Figure 7:
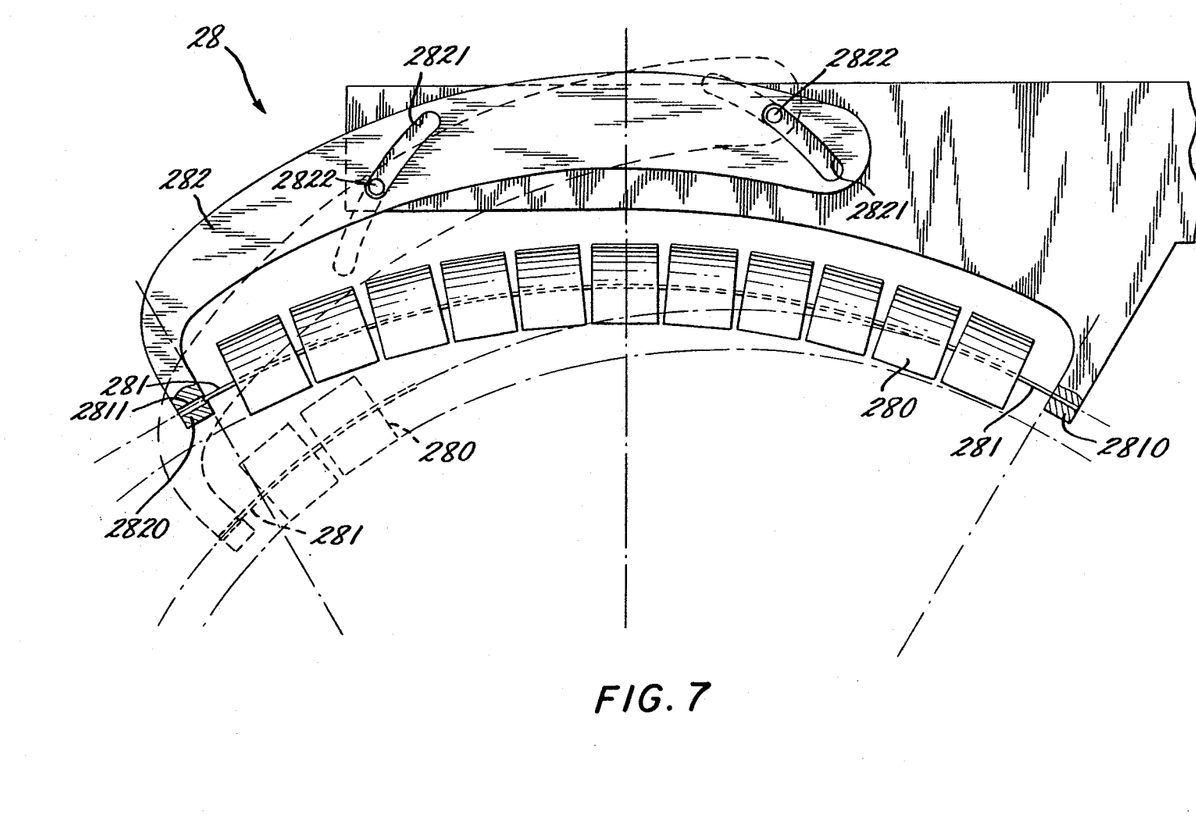
FIG. 7 shows a receiving device forming part of a variant of the invention.

In another particularly interesting embodiment (FIG. 7), the holding means 281 are flexible so that the receiving device 28 can adapt itself to the curvature of the zone of a tire on which a reinforcement is produced. The device 28 is shown in solid lines in a first configuration while the same device 28 is shown in dashed line in a second embodiment which is adapted to a greater curvature of the crown of a tire. By way of example, the holding means 281 are formed of a flexible blade, one extremity 2810 of which is fastened immovably with respect to the presentation members 3. Its positioning with respect to the tire is therefore assured by the approach adjustment of the assembly of laying members 2. The other extremity 2811 of the blade is mounted on an element 282 whose extremity 2820 describes an appropriate trajectory, imposed by the sliding of two grooves 2821 on two spurs 2822 which are stationary with respect to the presentation member 3.

Figure 3:
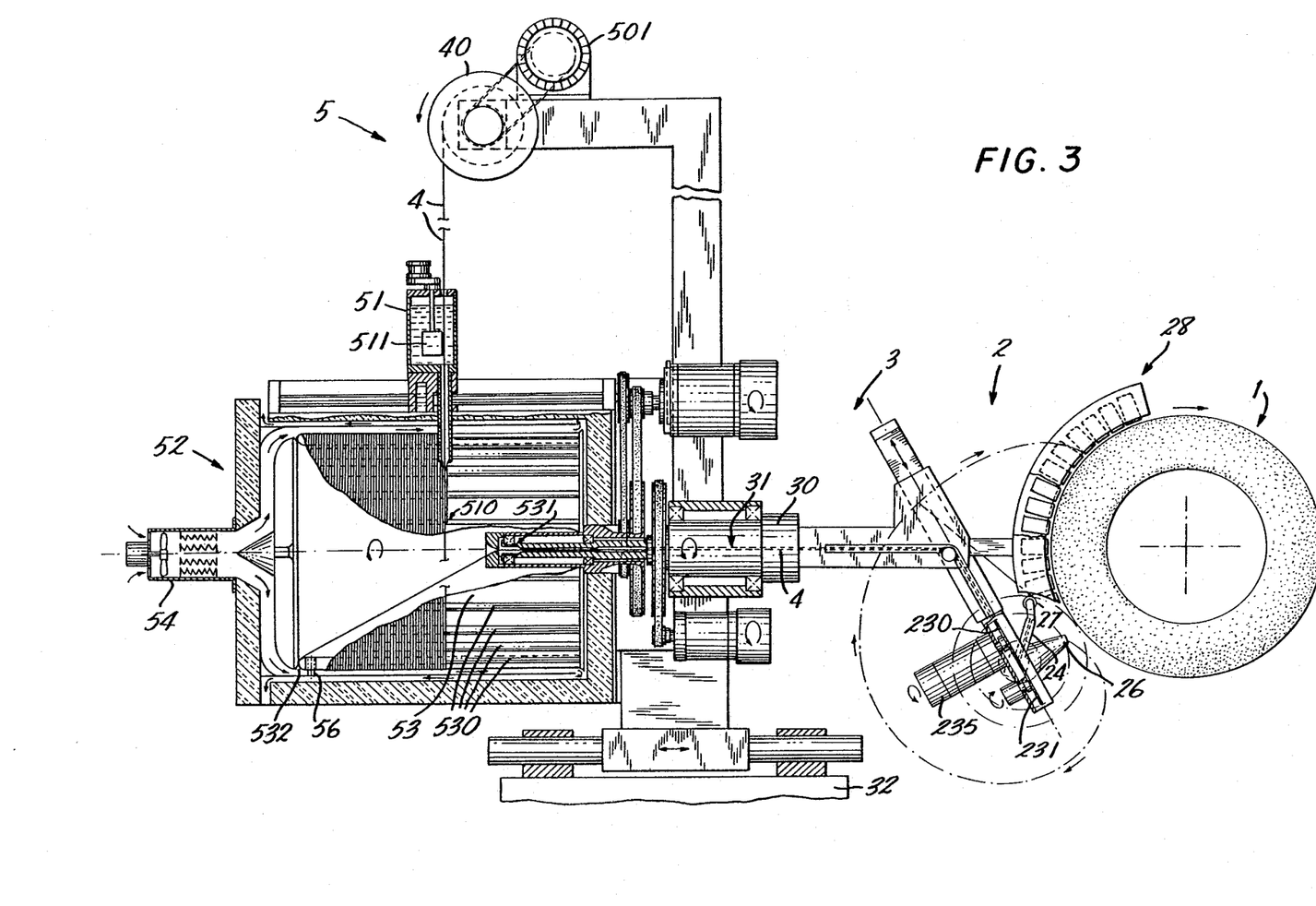
FIG. 3 is a view in elevation of the machine shown in part in FIG. 2.

The description which follows refers to a device 5 for the preparation of the cord 4, shown in FIG. 3. The role of this device 5 is, on the one hand, to coat the cord 4 with a layer of rubber and to partially pre-vulcanize the layer of rubber and, on the other hand, to store at least the amount of cord 4 necessary for the production of a reinforcement in such a manner that the cord 4 can be called up by the means 230, 231 imposing the linear speed of laying of the cord 4 without opposing any inertia other than that of the cord 4 itself to the calling up.

The cord 4 is supplied on bobbin 40. The unwinding of the bobbin 40 is counteracted by a brake in order to maintain tension on the cord 4. The cord 4 then extends into a cup 51 filled with a rubber solution (concentration preferably at least equal to 20% rubber in order to obtain a very viscous liquid). At the lower extremity of the cup 51 there is a die 510 of a diameter just greater than that of the cord 4. In order to improve the coating of the cord 4 by the rubber solution, a roller 511 is provided which continuously conducts rubber solution along the cord 4. The cord 4 then penetrates into a cylindrical enclosure 52 (shown in cross section in FIG. 3) within which the cord 4 can be wound on a drum 53 bearing radial plates 530 on the edge of which turns of the cord 4 which is coated with the rubber solution are wound. The cord 4 is arranged there in such a manner that it can be pulled by the rollers 230 and 231 while maintaining the drum 53 stationary. For this purpose, a layer of cord 4 is wound around the drum 53, placing it with a pitch greater than the diameter of the cord 4 by a rotation of the drum 53 which is coordinated with a displacement of the die 510 for the presentation of the cord 4 in the cylinder 52 along a slot parallel to the axis of the cylinder 52 and arranged in the wall thereof. This die 510 and the cup 51 are mechanically connected. The cord 4 is permanently threaded through all the parts of the machine. In particular, during the course of the loading of the drum 53, the cord 4 rests, on the one hand, on the drum 53 which is placed in rotation and, on the other hand, is threaded into the laying members 2 which constitute an assembly immovable in rotation with respect to the cylinder 52 and inactive during the phase of the loading of the drum 53. In order not to twist the cord 4 on itself, it is necessary to immobilize it in rotation with respect to the drum 53 by means of a clamp 531 and to allow it to turn freely on itself in all the parts of the machine, by moving the rollers 230 and 231 away from each other.

In order to start the winding of the cord 4 on the drum 53, a spur 56 close to the left axial edge of the drum 53 (see FIG. 3) protrudes from out of the drum 53 until reaching the radially inner wall of the cylinder 52. The die 510 presents the cord 4 axially on the side of the spur 56. The drum 53 being placed in rotation, the spur 56 necessarily hooks the cord 4, this starting the winding. This is stopped when sufficient cord 4 has been stored to produce a reinforcement.

When the drum 53 is loaded, the rubber deposited on the cord 4 is pre-vulcandzed by slightly circulating a stream of hot air, the air being heated by any suitable heating means (for instance, electric resistors) and placed in circulation by a suitable device 54 (for instance, a fan) and travels on the periphery of the drum 53 (as indicated by the arrows in FIG. 3), to go towards a suction hood.

Upon the production of the reinforcement, the cord 4, pulled by the rollers 230 and 231, leaves the drum 53 (held stationary) through the extremity where the winding on the drum 53 was started (to the left in FIG. 3), sliding on the rounded extremity 532. During this phase, the spur 56 is retracted and the clamp 531 is opened.

In order to effect a new loading, it is necessary to bring the length of cord 4 or the few turns of cord 4 arranged on the right-hand axial extremity of the drum towards the left side, that is to say the side towards which the cord 4 is pulled by the laying members 2. A motor 501 has therefore been provided which makes it possible to pull the cord 4 back on the bobbin 40 while the die 510 returns to the left side of the drum 53.

The complete cycle of the machine is therefore as follows: Loading of the drum 53, pre-vulcanizing of the rubber covering of the cord 4, then laying of the cord 4 is its place in the reinforcement. One can, of course, provide any equivalent device to feed the laying members 2 with cord 4, provided that this feeding takes place preferably without other inertia than that of the cord 4 or, at least, a very low inertia compatible with the acceleration of the conduit 24 and of the rollers 230 and 231 up to their nominal speed in one turn of the conduit 24, which speed must be sufficient to effect the laying by projection. By way of example, the metal cable of the type indicated above can be laid by means of a conduit 24 the speed of rotation of which is at least on the order of 1500 rpm.

The invention which has just been explained is not limited to the examples described but covers also all variants which reproduce the essential elements thereof and, in particular, those which assure the continuous laying of a reinforcement cord imparting to the cord both a radial and circumferential path so as to throw it, by lengths, into its position in the reinforcement.

What is claimed is:

1. A machine for the production of a tire reinforcement, the reinforcement comprising adjacent, substantially parallel cords, characterized by the fact that the machine comprises laying members comprising:
    means imposing a linear speed of laying on the reinforcement cord;
    a rotary conduit fastened on a shaft constituting an axis of rotation of the conduit, in such a manner that a radially outer extremity of the conduit is directed substantially in a plane perpendicular to the axis of rotation of the conduit, the conduit receiving the reinforcement cord at a base of the conduit which is located approximately on the axis of rotation and projecting the cord in a path along said perpendicular plane through the radially outer extremity into its place to form a reinforcement of adjacent, substantially parallel cords; and
    means for cutting the cord.

2. A machine according to claim 1, characterized by the fact that the machine comprises a support for the cord, which support is integral with the conduit, fastened radially in an extension of the radially outer extremity and just to the rear with respect to the direction of rotation of the conduit, and by the fact that the means for cutting the the cord are located radially between the radially outer extremity and the support.

3. A machine according to claim 2, characterized by the fact that the means for cutting the cord are formed of a knife which is fastened at an angle in the vicinity of a zone of laying of the cord.

4. A machine according to claim 2, characterized by the fact that the support consists of a roller.

5. A machine according to claim 1, characterized by the fact that the machine further comprises a device for receiving the reinforcement cord, receiving the cord in the plane of rotation of the conduit.

6. A machine according to claim 5, characterized by the fact that the receiving device is formed essentially of plates fastened to a holding means, the plates being arranged in pairs on opposite sides of the projected path of the cord.

7. A machine according to claim 6, characterized by the fact that the holding means are flexible so that the receiving device can adapt itself to the curvature of a zone of a tire on which a reinforcement is produced.

8. A machine according to claim 1, including position and orientation adjusting means to adjust the presentation of the laying members with respect to an element on which the reinforcement is produced.

9. A machine according to claim 1, characterized by the fact that the machine comprises cord preparation means to coat the cord with a layer of rubber, to partially pre-vulcanize the layer of rubber and to store at least a length of the cord necessary for the production of a reinforcement in such a manner that the cord can be called up by the means imposing the linear speed of laying on the cord without imposing any inertia other than that of the cord itself to the means imposing the linear speed of laying on the cord.

10. A machine according to claim 9, characterized by the fact that the cord preparation means comprises a drum bearing radial plates on the edge of which turns of cord are wound, a cup containing a rubber solution into which the cord is immersed, and heating means.

* * * * *